Aug. 23, 1966 W. C. KNOEBEL 3,268,234
MULTI-PURPOSE PISTON RING ASSEMBLY
Filed May 10, 1963 2 Sheets-Sheet 1

INVENTOR.
WALTER C. KNOEBEL
BY
ATTORNEYS

Aug. 23, 1966 W. C. KNOEBEL 3,268,234
MULTI-PURPOSE PISTON RING ASSEMBLY
Filed May 10, 1963 2 Sheets-Sheet 2

INVENTOR.
WALTER C. KNOEBEL
BY John H. Sutherland
ATTORNEYS

United States Patent Office 3,268,234
Patented August 23, 1966

3,268,234
MULTI-PURPOSE PISTON RING ASSEMBLY
Walter C. Knoebel, St. Louis County, Mo., assignor to McQuay-Norris Manufacturing Company, St. Louis, Mo., a corporation of Delaware
Filed May 10, 1963, Ser. No. 279,413
3 Claims. (Cl. 277—139)

This invention relates to piston rings and more specifically to a piston ring which is so constructed that, when installed in one kind of a piston, it will serve certain purposes primarily, and, when installed in another kind of piston, it will serve certain other purposes primarily. One of the advantages of such a piston ring construction is its adaptability.

This description refers to piston rings for one, or more, purposes. It should be understood that these purposes include piston rings intended primarily for control of compression and combustion gas pressures (compression rings) and rings primarily intended for control of lubrication (oil control rings). In this case, a combined purpose ring is one adapted to serve either as a compression ring, or an oil control ring. This invention relates to piston rings for combined purposes according to this definition. In other words, this invention relates to a piston ring of the kind in which the purpose primarily served is determined by the installation. The purpose, or purposes, served by the piston ring, according to this invention, therefore, depend upon the type of piston in which it is installed, its location on that piston, and the characteristics of the piston ring groove in which the piston ring is installed.

The type of piston, preferred by engine manufacturers, changes from time to time. At one time, a piston was used extensively which had a head and skirt, and the ring belt on the head contained four ring grooves separated by lands. Various combination of rings were used, but usually at least the two top rings were compression rings. At the present time, the preferred piston has a head and a skirt in which the head contains a ring belt with three piston ring grooves separated by lands. Competition between engine makers, however, may produce a trend to pistons of the type having only two piston ring grooves in the ring belt about the head of the piston. Engineers have long recognized the competitive advantages to be realized by decreasing the number of ring grooves and, accordingly, the number of piston rings. The decrease in the number of piston ring grooves and rings shortens the ring belt and the length of the piston. A shorter piston means a shorter cylinder and an overall decrease in the size of the engine and its weight. This conclusion is confirmed by statements found in some prior patents, notably Bowers 2,414,013.

As of the present time, the engine makers prefer the type of piston, above described, with a ring belt containing three separate ring grooves, two for compression rings at the top and one for an oil ring at the bottom. The piston ring, according to this invention, is adapted for use in a bottom ring groove as an oil control ring in this or any other type of multi-groove piston.

Looking into the future, it may occur that the type of piston using but two ring grooves in the ring belt becomes preferred. This type of piston uses one compression ring, or fire ring, in the top groove of the piston and one dual purpose ring for both compression and oil control in the lower groove. As far as weight saving in the engine is concerned, the same advantages are to be gained from going from a three ring type of piston to a two ring type of piston as were gained by the change from a four ring type of piston to a three ring type of piston. Should such a change be in the offing, it would be made equally attractive to the piston ring manufacturer who has in production a piston ring to serve either a single purpose of oil control, or the dual purpose of oil and compression, required by a combined purpose ring in the piston having but two piston ring grooves in the ring belt. This invention provides such a piston ring.

Thus, it is one of the objects of this invention to provide a piston ring assembly which is adapted to more than a single kind of installation and adapted to serve more than a single specialized purpose.

It is a further object of this invention to provide a piston ring adapted to both a single specialized purpose, or adapted to serve combined purposes depending solely upon the kind of installation provided.

It is a further object of this invention to provide a piston ring assembly having a spring type spacer-expander coacting with a split piston ring in such a way as to apply a force with respect to the piston ring which does not interfere with any initial set of the ring in the groove.

It is still another object of this invention to provide a piston ring assembly for a multi-purpose ring which includes a spring type spacer-expander and a pair of expansible piston ring elements so constructed that the expansive force of the spring produces a twist in opposite directions in the piston ring elements.

According to this invention, the multi-purpose piston ring is an assembly of two or more elements, as an example, a pair of split expansible piston ring elements, or rails, and a spring type spacer-expander ring element located between the piston rings, or rails. On the inner radial face of each piston ring element is a circumferentially extending shoulder. Each piston ring element is also chamfered at its inner periphery at its outer edge, or otherwise formed to impart a permanent set, or twist, to the piston ring element which will tend to cause the inner radial faces of the pair of spaced piston ring elements to diverge radially outwardly and converge radially inwardly.

The spacer-expander spring ring element is similar to that shown in the patent application of Theodore P. Rodenkirchen, Serial No. 163,462, filed January 2, 1962, now Patent No. 3,140,096, but it differs in its position with respect to the piston rings or rails. Preferably, it is located wholly within the inside periphery as well as the outside periphery of each of the piston ring elements and there exists considerable clearance between the inner periphery of the spacer-expander ring element and the inner periphery of each rail.

The spring type spacer-expander type ring element is a ribbon of spring steel formed as a split ring of the reverse loop type. The ends are arranged to abut to make it a circumferentially compressible spring. Such a circumferentially compressible spring will change diameter in response to balanced radial forces which squeeze the ring elements into the groove of the piston, but the entire piston ring assembly will float in the piston groove to a position in which such compressive forces are in balance. The assembly of ring elements are accordingly full floating and non-bottoming in the piston ring groove.

Preferably, the outwardly extending loops, or humps, of the spring type spacer-expander ring element are constructed to be more resilient than the inwardly extending loops, all as described in the aforesaid patent application of Rodenkirchen. The upper and lower edges of the ribbon forming the spacer-expander are notched circumferentially, and these notches engage the inner periphery of the circumferentially extending shoulders on the top and bottom piston ring elements to urge these elements radially outwardly of the piston grooves and against the cylinder walls.

As heretofore mentioned, each piston ring element is preferably made to have a permanent set, or twist.

Where two or more piston ring elements of the kind described and the spring type spacer-expander ring element are combined in an assembly, the circumferentially extending shoulders on each piston ring element are disposed inwardly to engage in the notches on opposite sides of the spacer-expander ring elements. Neither this, nor the spacer-expander ring's notches, interfere with the permanent set, or twist, in each piston ring element. The spacer-expander ring applies a resilient expansive force against the inner radial faces on the shoulders tending to augment the twist in the ring elements and it maintains the piston ring elements spaced a minimum distance apart. This function of the spacer-expander as a spacer element is by direct engagement between the inner radial faces on the piston ring elements and the outer radial faces on the spacer-expander. These surfaces do not exclude engagement of the shoulders in the bottom of the notches, which might be preferable in some installations. As can be readily realized, neither of these functions of the spacer-expander ring can interfere with the original set imparted to the piston ring.

Other objects and advantages of this invention will appear from the following detailed description which is in such clear, concise and exact terms, as will enable anyone skilled in the art to make and use the same when taken with the accompanying drawings, forming a part thereof, and in which.

Figure 6:
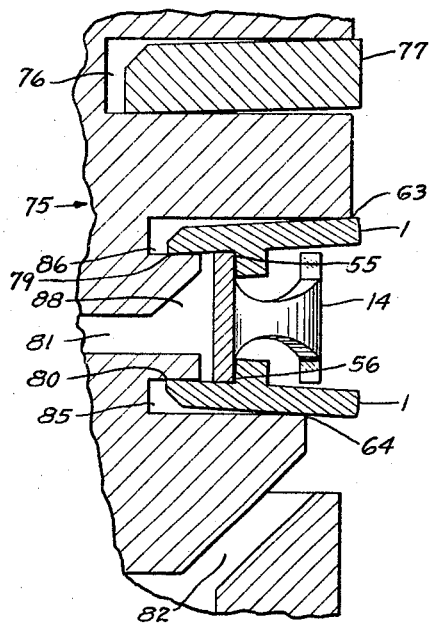
Figure 7:
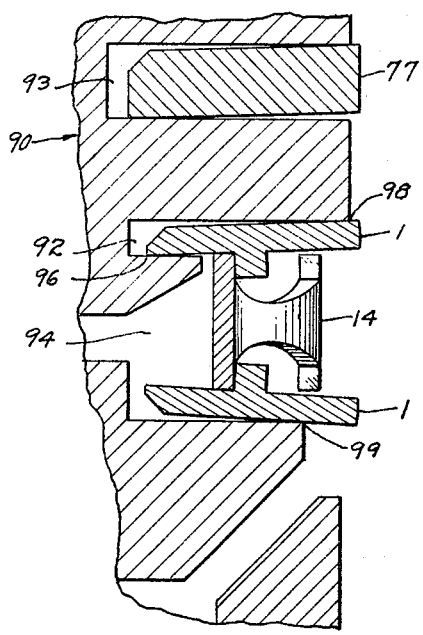

FIG. 6 is a fragmentary sectional view through a piston showing a piston ring, according to this invention, installed in the lower ring groove in a piston of the type having two or more piston ring grooves in the ring belt; and FIG. 7 is a fragmentary sectional view through a piston illustrating the piston ring, according to this invention, installed in the lower ring groove of another form of piston having two or more piston ring grooves in the ring belt.

Figure 1:
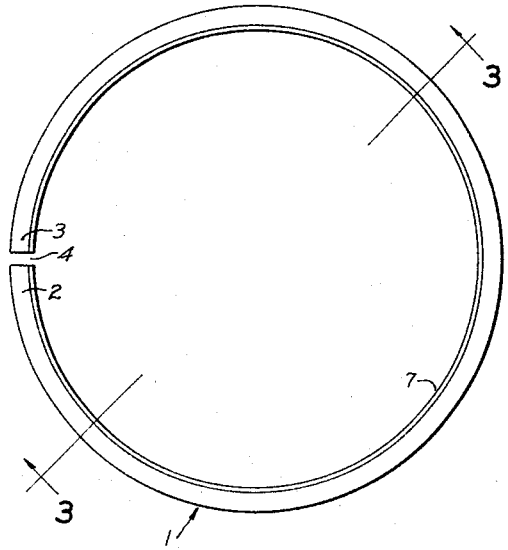
FIG. 1 is a top plan view of the piston ring element or rail constructed in accordance with the present invention.
Figure 2:
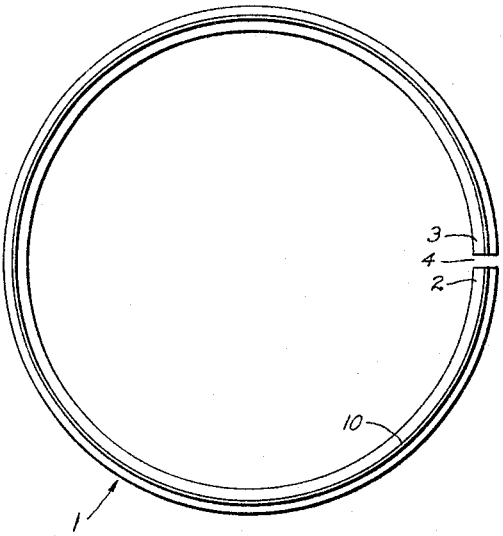
FIG. 2 is a plan view of the opposite side of the piston ring element shown in FIG. 1.
Figure 3:
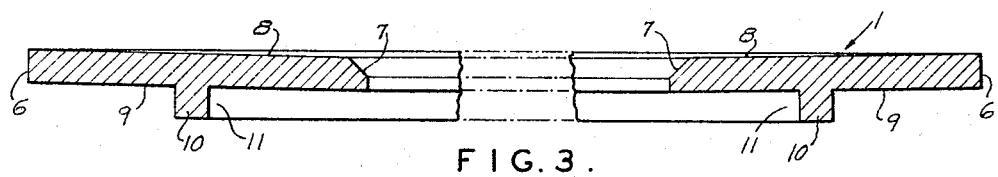
FIG. 3 is a transverse sectional view taken on the lines 3—3 of FIG. 1 looking in the direction of the arrows.

FIGS. 1–3, inclusive, illustrate the construction with a form of a piston ring element, such as can be used in a piston ring assembly, constructed in accordance with this invention. The rail 1 is made out of a flat strip of springy metal, such as a steel alloy, bent into a circle of slightly larger diameter than the cylinder in which it will be installed. Strip 1 has opposite ends 2 and 3 disposed in spaced relation. The gap 4 between the ends 2 and 3 is relatively wide when the rail is in a relaxed condition. When the rail is compressed to fit within the cylinder, the gap 4 is relatively narrow. The outer periphery of the rail 1, when made of coiled flat strip, may be rounded as at 6. Neither the material in the ring, nor its method of manufacture, are material to this invention. The surface 6 may have a special coating, such as a plating. The inside periphery of the rail 1 is notched, or chamfered, at its upper edge 7 to impart a natural twist, or set, to the rail, as shown exaggerated in FIG. 3. The notch, or chamfer, 7 extends into the radial face 8 which is dish-shaped because of the twist imparted to the rail. The lower radial face 9 is preferably parallel to the upper radial face 8 and formed thereon is a shoulder 10. On the inner periphery of shoulder 10 is a circumferential extending face 11.

Figure 4:
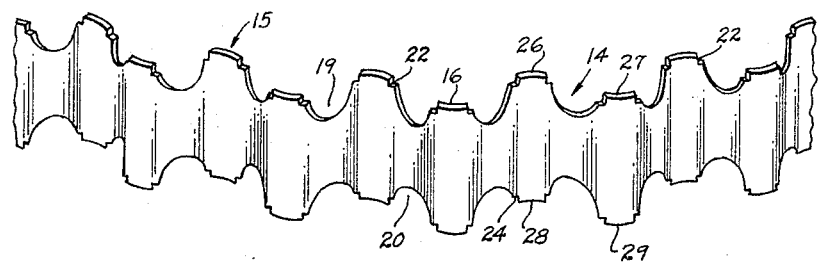
FIG. 4 is a view in perspective illustrating a portion of a spacer-expander spring ring constructed in accordance with this invention.

The spacer-expander is a strip of spring metal of circular shape, such as shown in FIG. 4, and corrugated transversely to form inner humps, or crests, 15 arranged along its inner periphery and outer humps, or crests, 16 at its outer periphery. The spacer-expander 14, shown in FIG. 4, is formed from a strip of metal of a uniform width. This strip is subsequently subjected to metal working operations to first form the plurality of arcuate notches 19 and 20 at its opposite edges. These are arranged along the opposite edges of the strip. Another metal forming operation provides the shoulders 22 and 24 at opposite edges of the strip alternately. Thereafter, the strip 14 is corrugated to form the inner loops, or humps, 15 and the outer humps, or loops, 16. These corrugations are formed with relation to the previous metal working operations so as to leave the full width of the original strip at opposite points, such as 26 and 28, and 27 and 29. When the strip 14 is subsequently coiled into a split ring, shoulders 22 and 24 will be located as shown between the inner humps, or loops, 15 and the outer humps, or loops, 16. In other words, the completed spacer-expander will have a plurality of inner humps, or loops, 15 lying along the circumference of an imaginary circle. This imaginary circle will be larger in diameter than the circular inner periphery of the piston ring element when both are compressed. The spacer-expander will also have a plurality of outer humps, or loops, 16 likewise along a circle, and this circle in turn is larger in diameter than the first, but smaller in diameter than the outer circular periphery of the piston ring element 1 when both are compressed. The shoulders 22 and 24 also lie along the circumference of a circle which is of a diameter such that it will lie between the imaginary circles through the inner humps 15 and the outer humps 16.

The shoulders 22 are arranged so as to engage the face 11 of the shoulder 10 on a piston ring, such as 1, disposed to be supported along the humps 26 and 27. The shoulders 24 are also located to engage a shoulder, such as 10, on a similar ring 1, in turn disposed to engage along the points 28 and 29 on the opposite side of the spacer-expander. In each instance, the locus of engagement between the shoulders 22 and 10 is a series of points on a circle spaced inwardly of, or eccentric with respect to, the adjacent radial face of the supported rail, and between the inner and outer periphery of that rail. The locus of engagement between shoulders 24 on the spacer-expander 14 and the shoulder 10 on a similar rail 1 is also a series of points on a circle spaced inwardly of the adjacent face of the rail and between the inner and outer periphery of that rail. The spacer-expander ring has inner loops 15 with points 26 and 28 to act as a support inwardly of shoulder 10. Points 27 and 29 provide for similar support along the outer humps 16. The assembly, contemplated by this invention, includes a spacer-expander strip, such as 14, supporting a pair of piston ring elements, such as 1, top and bottom so that each element can be supported in spaced relation by the inner and outer humps of the strip 14. If shoulders 10 engage the bottom of notches 22 and 24, these also would be points of support for the piston ring elements.

When the assembly is compressed into a piston ring groove, the spacer-expander 14 is compressed circumferentially by the engagement between the shoulder 10 of each of the rails and the shoulders 22 and 24 top and bottom of the spacer-expander. Thus, when the assembly is installed in a piston ring groove and the piston placed in a cylinder, there will be an outward force exerted on each of the rails between the shoulders 22 and the face 11 on shoulder 10 of one rail and the shoulders 22 and the face 11 on shoulder 10 of the other. This is illustrated perhaps better by FIGS. 5 through 7.

Figure 5:
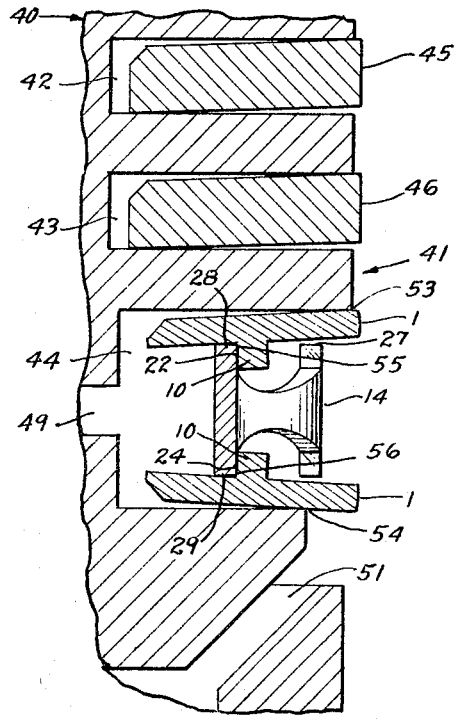
FIG. 5 is a fragmentary sectional view illustrating a piston ring constructed in accordance with this invention installed in a piston with a ring belt containing three or more piston rings.

Turning now to the illustration in FIG. 5, here a fragmentary section of a piston is illustrated on an enlarged scale. Only a portion of the head of the piston is shown which contains the ring belt. In FIG. 5, the piston head 40 has a ring belt, generally indicated as 41, containing three or more piston ring grooves, three of which are shown, 42, 43 and 44. The top grooves 42 and 43 contain rings 45 and 46. Top ring 45, or the one above it, as the case may be, is a so-called fire ring. The primary function of these rings 45 and 46 is to seal off the leakage of compression, or combustion gases, from escape between the piston 40 and its cylinder wall. In piston 40, the lower piston ring groove 44 is especially formed to accommodate a piston ring which is primarily intended for the purpose of oil control. Accordingly, this ring groove 44 is provided with oil drainage slots 49 and 51 so arranged to return the oil accumulated by the piston ring in that groove back to the crank case of the engine. To illustrate, one of the uses of the instant invention, a ring assembly, constructed as aforedescribed, has been shown installed in the groove 44. Piston ring elements, here shown as rails 1, are held spaced by a spacer-expander spring, such as 14 heretofore described. Since these rails 1 are normally of dish-shape, as shown in FIG. 3, there is a sealing point 53 between the top rail 1 located at the edge of the pistol ring groove 44. Likewise, there is a sealing point 54 between the surface of the lower rail 1 and the lower edge of the piston ring groove 44. This is due to the inherent shape imparted to the rails by their method of manufacture. In addition, there is a pressure point 55 between the shoulder 22 and the face 11 of the shoulder 10 of the top rail 1, and a similar pressure point 56 between the shoulder 24 and the face 11 of the shoulder 10 of the bottom rail 1. Neither of these pressure points 55 or 56 will interfere in any way with the permanent set in the piston ring element, shown here as rails 1. Thus, the action of this piston ring is such that on the upper stroke, oil is prevented from escaping past the seal point 53, and, on down stroke, oil is prevented from escaping past the seal point 54. It has been discovered that better oil control can be obtained if these sealing points, or zones, 53 and 54 remain effective, and especially so if all of the expansive forces on the piston ring elements 1 are such as not to interfere with, and, if desired, augment the set imparted to these elements.

Turning now to FIG. 6, this view illustrates on an enlarged scale the ring belt portion in another type of piston 75. This type of piston has two or more ring grooves. Only two are shown. The top groove 76, or, if more than two grooves are provided, then this and the ones above, receive a ring, or rings, 77, the primary purpose of which is to seal the clearance between the piston 75 and the cylinder wall against the leakage of gases due to compression, or combustion, pressures. The ring belt on this piston 75 also contains a lower ring groove, generally indicated by the reference character 88. This ring groove 88 has an oil drainage slot, or slots, 81 connecting with the piston ring groove 88. There is also an oil drainage slot 82. In the bottom of the ring groove 88 are a pair of annular slots 85 and 86, each of which receives the inner periphery of one of a pair of piston ring elements here shown as rails 1 of the piston ring assembly. Since these elements have a dished configuration and are located in the slots 85 and 86, there will be two sealing points on each ring. On the upper element 1, there will be a sealing point along a circumferential line 63 at the edge of slot 88 and another along a circumferential line 79 at the inner edge of the rail 1. Thus, any combustion gases passing the ring 77 and behind the upper rail 1 will be trapped in the groove 86 behind the rail 1 forcing the rail outwardly to seal against the escape of gas pressure between its outer periphery and the cylinder wall.

The lower piston ring element, also shown here as a rail, is also dished, consequently, the same action will prevail, that is, there will be a sealing point at the edge of the groove 88, indicated as 64, extending circumferentially of the piston. These two seals will prevent the escape of oil upwardly past the lower rail 1 into the piston ring groove 88. The upper element 1 of the assembly will act primarily as a compression ring because its outward pressure against the cylinder wall will vary directly with the gas pressure acting on its inner periphery to force it outwardly. The lower element 1 will act primarily as an oil control ring preventing the escape of oil into the piston ring groove 88. Expander 14 acts as the spacer exerting an outward pressure on the face 11 of the shoulder 10 of the upper element 1 at the points 55. The lower element 1 is urged outwardly by the shoulders 24 acting on the face 11 of the shoulder 10 at a series of points 56. Neither the points 55 or 56 are disposed to interfere in any way with the permanent set in the piston ring elements.

The piston 90, shown in FIG. 7, is of a type similar to that shown in FIG. 6. It has only a pair of piston ring grooves, as shown, in the ring belt, but there may be several. The upper groove 93 receives the piston ring assembly, such as heretofore described. In the bottom of the ring groove 94 is an annular groove 92 receiving the upper piston ring element 1. Contact between the upper element 1 and the groove 94 is such as to produce a sealing point 98 circumferentially of the piston adjacent the outer edge of the groove and another 96 at the inner peripheral edge of the element 1. Lower element 1 also is dished so as to provide a seal at the point 99 extending around the periphery of the piston 90.

The three different installations in FIGS. 5, 6 and 7 determine the primary purpose of the piston ring assembly, according to this invention. In FIG. 5, the purpose of the assembly is primarily as an oil control ring. In FIGS. 6 and 7, the assembly is dual purpose in that the top element acts as a compression ring, while the bottom acts primarily as an oil control ring. The purpose of the two installations in FIGS. 6 and 7 is similar, but the double sealing action on each element 1 is characteristic of only the installation shown in FIG. 6. Both elements 1 in FIG. 6 have a double seal at the outer and inner periphery of each. For this reason, FIG. 6 is the preferred manner of installation for a dual purpose ring constructed in accordance with this invention.

Changes in and modifications of the construction described may be made without departing from the spirit of my invention or sacrificing its advantages.

Having thus described the invention, what is claimed and desired to be secured by Letters Patent is:

1. In a piston ring assembly for a cylinder and piston combination, said piston having a peripherally extending groove with upper and lower lands, said ring assembly including a pair of substantially identical cylinder-engaging rings, and a circumferentially expansible and contractible non-bottoming expander spring disposed axially between said rings and in radially-outward biasing relation therewith, the improvement which comprises: each cylinder-engaging ring having:
   (1) an outer peripheral face for engaging the cylinder, and an inner peripheral face radially remote from said outer peripheral face,
   (2) a side face for engaging one of said lands; said side face extending between said inner and said outer peripheral faces, and, at any cross-section taken along a radius, being substantially flat but out of normal to the axis of said ring in the sense that said side faces of the respective cylinder-engaging rings converge toward said axis;
   (3) an opposite side face having a circumferentially extending, axially projecting rib intermediate said peripheral faces, said rib providing an expander-thrust-receiving-surface which makes an angle of not more than 90° with said opposite side face and which surface is located closer to said inner peripheral face than to said outer peripheral face;

said groove having a sub-groove embracing the inner periphery of the uppermost one of said cylinder-engaging rings and engaging the opposite side (3) thereof adjacent its inner periphery; said rings being disposed with their respective ribs addressed toward each other and the expander-thrust-receiving-surface of each rib being so engaged with said expander spring that the radially outward biasing action of the expander is delivered to said ribs substantially free of components which tend to decrease the converging relationship between the first-mentioned side faces of the respective cylinder-engaging rings.

2. The piston ring assembly of claim 1 wherein the expander spring is a strip of spring material corrugated to define a series of inner humps and a series of outer humps in alternating relationship, and the respective series of humps are astride the ribs of said rings.

3. The piston ring assembly of claim 1 wherein the uppermost one of said cylinder-engaging rings has its inner peripheral face so beveled at its virtual corner with said side face (2) that when compressed to cylinder diameter the ring tends to dish in a direction which moves the inner lower corner below the level of the outer lower corner.

References Cited by the Examiner

UNITED STATES PATENTS

| | | | |
|---|---|---|---|
| 2,231,801 | 2/1941 | Cords | 277—139 |
| 2,877,072 | 3/1959 | Pien | 277—139 |
| 3,000,678 | 9/1961 | Braendel | 277—139 |
| 3,004,811 | 10/1961 | Mayfield | 277—139 |
| 3,024,029 | 3/1962 | Brenneke | 277—139 |

LAVERNE D. GEIGER, *Primary Examiner.*

SAMUEL ROTHBERG, *Examiner.*

L. RANEY, J. MEDNICK, *Assistant Examiners.*